US012658784B2

(12) United States Patent
Aden

(10) Patent No.: US 12,658,784 B2
(45) Date of Patent: Jun. 16, 2026

(54) TRANS-INDUCTOR VOLTAGE REGULATOR (TLVR) TO REDUCE VOLTAGE HAZARDS

(71) Applicant: Arista Networks, Inc., Santa Clara, CA (US)

(72) Inventor: Charles Melvin Aden, Berkeley, CA (US)

(73) Assignee: Arista Networks, Inc., Santa Clara, CA (US)

( * ) Notice: Subject to any disclaimer, the term of this patent is extended or adjusted under 35 U.S.C. 154(b) by 230 days.

(21) Appl. No.: 18/399,207

(22) Filed: Dec. 28, 2023

(65) Prior Publication Data

US 2025/0219528 A1    Jul. 3, 2025

(51) Int. Cl.
*H02M 1/32* (2007.01)
*H02M 5/293* (2006.01)

(52) U.S. Cl.
CPC ............. *H02M 1/32* (2013.01); *H02M 5/293* (2013.01)

(58) Field of Classification Search
CPC ................................. H02M 1/32; H02M 5/293
See application file for complete search history.

(56) References Cited

U.S. PATENT DOCUMENTS

| | | | | |
|---|---|---|---|---|
| 11,303,204 | B1 * | 4/2022 | Zhao ................... | H02M 3/1588 |
| 2022/0109368 | A1 * | 4/2022 | Zhou ................... | H02M 3/1586 |
| 2022/0216793 | A1 * | 7/2022 | Shao ................... | H02M 3/1566 |
| 2022/0376600 | A1 * | 11/2022 | Jong ................... | H02M 3/1582 |
| 2023/0049859 | A1 * | 2/2023 | Capetillo .......... | H02M 3/33569 |
| 2023/0057705 | A1 * | 2/2023 | You ................... | H02M 3/33571 |
| 2023/0299687 | A1 * | 9/2023 | Shao ................... | H02M 3/1586 |
| 2023/0378874 | A1 | 11/2023 | Ikriannikov et al. | |
| 2024/0120847 | A1 | 4/2024 | Jiang et al. | |
| 2025/0062678 | A1 * | 2/2025 | Venkatraman ...... | H02M 3/1586 |
| 2025/0062695 | A1 * | 2/2025 | Narula ................... | H02M 1/32 |
| 2025/0093392 | A1 * | 3/2025 | Rizzolatti ............... | H02M 1/32 |

FOREIGN PATENT DOCUMENTS

CN            116470578 A        7/2023

OTHER PUBLICATIONS

Infineon Technologies AG, "Multiphase Buck Converter with TLVR Output Filter," Document No. AN_2011_PL12_2012_221647, V1.2, Dec. 2, 2021, Munich Germany; 28 pages.
Jun. 2, 2025 European Extended Search Report from EU Application No. 24218308.5-1002; 10 pages.
Shao Hang et al., "Analytic Model and Design Procedure of the Single-Secondary Trans-Inductor Voltage Regulator," 2021 IEEE Energy Conversion Congress and Exposition, Oct. 20, 2021; 6 pgs.

* cited by examiner

*Primary Examiner* — Rafael O De Leon Domenech
(74) *Attorney, Agent, or Firm* — Patent Capital Group

(57)            ABSTRACT

Particular example embodiments described herein can provide for a system, an apparatus, and a method for a trans-inductor voltage regulator to reduce voltage hazards. The system, apparatus, and method can include, for example, a trans-inductor voltage regulator (TLVR) circuit that includes a multi-phase voltage regulator circuit; a plurality of phases of a primary winding connected in series. The plurality of phases includes a first phase and a last phase. The TLVR circuit can further include a ground located between the first phase and the last phase, and a compensation inductor situated such that at least one of the plurality of phases is between the ground and the compensation inductor.

20 Claims, 12 Drawing Sheets

402

410

800

START

802 — PEAK THRESHOLD VOLTAGE VALUE
FOR A TLVR CIRCUIT IS DETERMINED

804 — THE NUMBER OF PHASES IN THE
TLVR CIRCUIT IS DETERMINED

808 — A LOCATION BETWEEN PHASES IN THE TLVR
CIRCUIT FOR A GROUND OF THE TLVR
CIRCUIT IS DETERMINED SUCH THAT THE
PEAK VOLTAGE OF THE TLVR CIRCUIT DOES
NOT EXCEED THE PEAK THRESHOLD
VOLTAGE VALUE FOR THE TLVR CIRCUIT

END

TRANS-INDUCTOR VOLTAGE REGULATOR (TLVR) TO REDUCE VOLTAGE HAZARDS

TECHNICAL FIELD

This disclosure relates in general to the field of computing, and/or circuit design, and more particularly, to a system, an apparatus, and a method to enable a trans-inductor voltage regulator (TLVR) to reduce voltage hazards.

BACKGROUND

Multiphase voltage regulators (VRs) play an increasingly important role as they are used to power a wide range of microprocessors, such as CPUs, GPUs, and ASICs. In recent years, the power demand for these microprocessors has been increasing drastically, especially in telecom and also in some emerging applications, such as crypto mining and autonomous driving systems. Microprocessors are thereby requiring higher current with a higher slew rate and VRs are required to have a faster dynamic response during load transients to satisfy the output voltage ripple requirements.

A trans-inductor voltage regulator (TLVR) circuit or structure is an effective implementation to accelerate dynamic responses during the load transients of multiphase VRs. A trans-inductor voltage regulator is a type of voltage regulator that uses a winding of a transformer as an output inductor. In a multiphase TLVR circuit, for each transistor, a winding of the transformer can be employed as an output inductor of a phase. The other windings of the transformers of all the phases can be connected in a series loop to ground. Because of the series connection of the other windings, the phases are able to respond to a change in load current, allowing for a faster transient response compared to conventional voltage regulators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
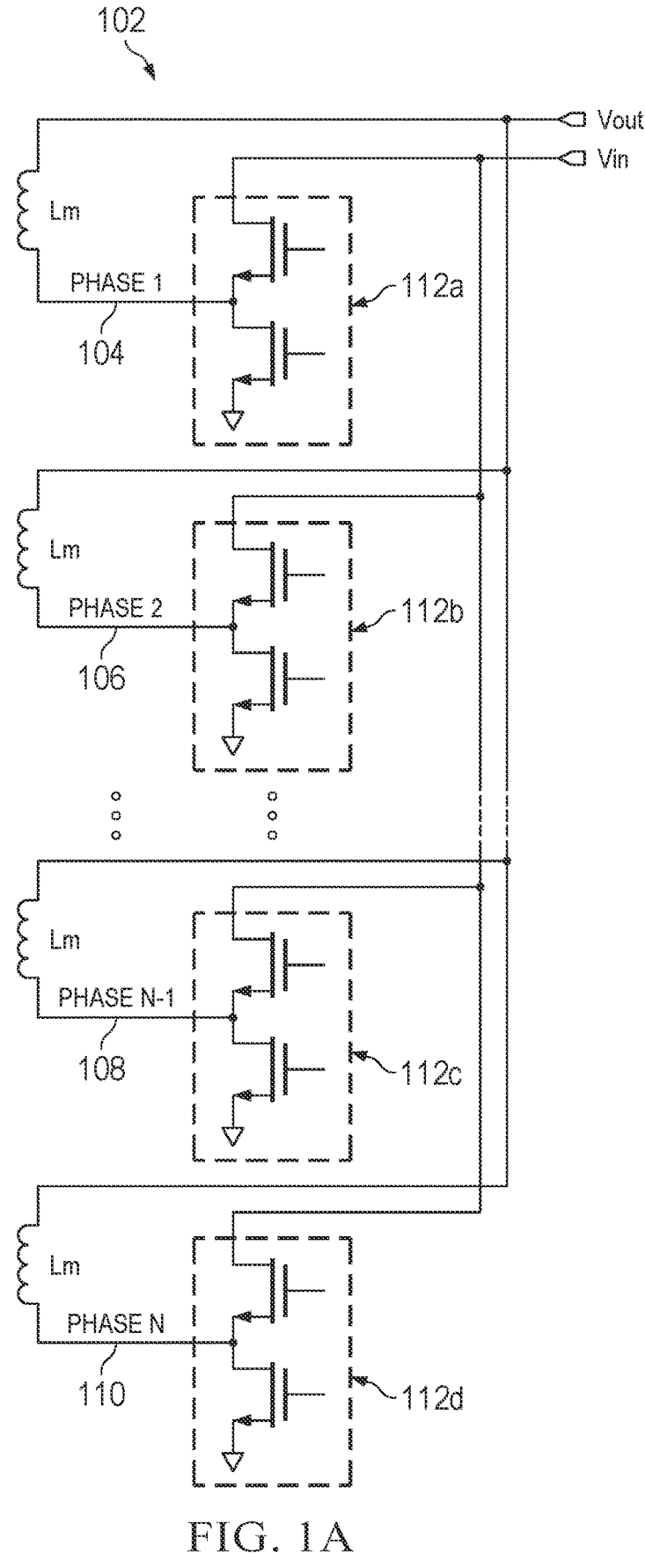
FIG. 1A is a simplified block diagram of a multi-phase voltage regulator (VR) circuit, in accordance with an embodiment of the present disclosure.

The FIGURES of the drawings are not necessarily drawn to scale, as their dimensions can be varied without departing from the scope of the present disclosure.

DETAILED DESCRIPTION

The following detailed description sets forth examples of apparatuses, methods, and systems relating to enabling a trans-inductor voltage regulator (TLVR) circuit to reduce voltage hazards in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

A trans-inductor voltage regulator (TLVR) circuit is an effective implementation to accelerate dynamic responses during the load transients of multiphase voltage regulators (VRs). In a TLVR circuit, a secondary winding of each transformer can be employed as an output inductor of a phase. The primary windings of the transformers of all the phases can be connected in a series loop to ground. Because of the series connection of the primary windings, the phases are able to respond to a change in load current, allowing for a faster transient response compared to conventional voltage regulators and during transients, the chain of transformers are able to sum together voltages on their outputs. More specifically, because the primary windings are connected in series, the voltage on the primary side (the area of the TLVR circuit that includes the primary windings connected in series) of the TLVR circuit can be N (the number of transformers) times the voltage (e.g., 10.2V in 12V to 1.8V applications). Hence, the voltage on the output side of the inductor can be the output rail voltage, in this example case 1.8V. The voltage on the other side of the inductor can be viewed as the input voltage, in this example case 12V. Therefore, the voltage across the inductor, when the phase is ON, would be 12-1.8=10.2V in this example scenario.

Further, if there are ten (10) transformers and all of them are active, then the voltage on the primary side of the TLVR circuit is one-hundred and two volts (102V) (ten (10) times 10.2V). If there are twenty (20) transformers and all of them are active, then the voltage on the primary side of the TLVR circuit is two-hundred and four volts (204V) (twenty (20) times 10.2V), etc. Some TLVR circuits can include over thirty (30) transformers and, if all of them are active, they can create a relatively large voltage on the primary side of the TLVR circuit. As a result, the TLVR circuit has the property that high voltages can appear on the primary side of the TLVR circuit during transients, and the high voltages could create a safety hazard (e.g., complicate testing and compliance with UL and other certifications, damage the board and components of the TLVR circuit, etc.).

A TLVR circuit can be designed to reduce voltage hazards on the primary side of the TLVR circuit in accordance with an embodiment of the present disclosure. In an example, the ground of the TLVR circuit can be moved from the edge of the TLVR circuit to a middle portion of the TLVR circuit. The middle portion can be located anywhere between the first phase of the TLVR circuit and the N phase (last phase) of the TLVR circuit. When the string of transformers forces a current change in the loop of the TLVR circuit, the voltage drop across the compensation inductor remains the same. However, the voltage drop across the transformers on a first side of the ground appears as a positive value on a first side of the compensation inductor and the voltage drop across the transformers on an opposite second side of the ground appears as a negative value on an opposite second side of the compensation inductor. If half of the transformers are on the first side of the ground, the first side of the compensation inductor will see $+V/2$ and the other half of the transformers on the opposite second side of the ground will see $-V/2$. In other words, when half of the transformers are on the first side of the ground and the other half of the transformers are on the opposite second side of the ground, half of the voltage is negative and half of the voltage is positive, thus limiting the voltage extremes on the primary side of the TLVR circuit.

In another example, the TLVR circuit can include a first compensation inductor located on one end of the loop between the ground and the first transformer, and a second compensation inductor can be located on the other end of the loop between the ground and the last transformer. When the string of transformers forces a current change in the loop, the voltage change across each compensation inductor is half the voltage change of a TLVR circuit with a single compensation inductor, due to the inductance of each compensation inductor being halved. Each compensation inductor sees half the voltage, one is positive, and one is negative.

In yet another example, a controller can limit the number of phases or transistors that can be turned on or activated at the same time to limit the peak voltage of the TLVR circuit. More specifically, in a TLVR circuit, a controller controls the activation of each phase of the TLVR circuit. Using a predetermined voltage threshold, a voltage engine in the controller can limit the number of phases that are activated at the same time in order to keep the overall voltage of the TLVR circuit at, near, or below an acceptable voltage. Note that while the present disclosure encompasses the possibility of 'on the fly' arrangements, other embodiments can implement a predetermined model, as detailed herein. Such a model could be beneficial, for example, in a scenario in which a designer would choose to be under a legal limit such as an "extra low Voltage" ("ELV") limit, which would be constant. This could exist in environments such as, for example, the European Union's "low Voltage directive" (LVD), which is set at 75V DC for consumer goods.

Example Systems, Apparatuses, and Methods

FIG. 1A is a simplified block diagram of a particular non-limiting multi-phase voltage regulator (VR) circuit 102. The multi-phase VR circuit 102 can have N phases, where N is an integer number. For example, the multi-phase VR circuit 102 can include a first phase 104, a second phase 106, . . . , an (N-1) phase 108, and an N phase 110. Each phase of the multi-phase VR circuit 102 can include transistors. For example, as illustrated in FIG. 1A, the first phase 104 can include transistors 112a, the second phase 106 can include transistors 112b, . . . , the (N-1) phase 108 can include transistors 112c, and the N phase 110 can include transistors 112d. To accelerate the dynamic response during the load transients of the multi-phase VR circuit 102, a loop consisting of transformer primary windings and a single compensation inductor is often added to the multi-phase VR circuit 102 to create a trans-inductor voltage regulator (TLVR) circuit.

Figure 1B:
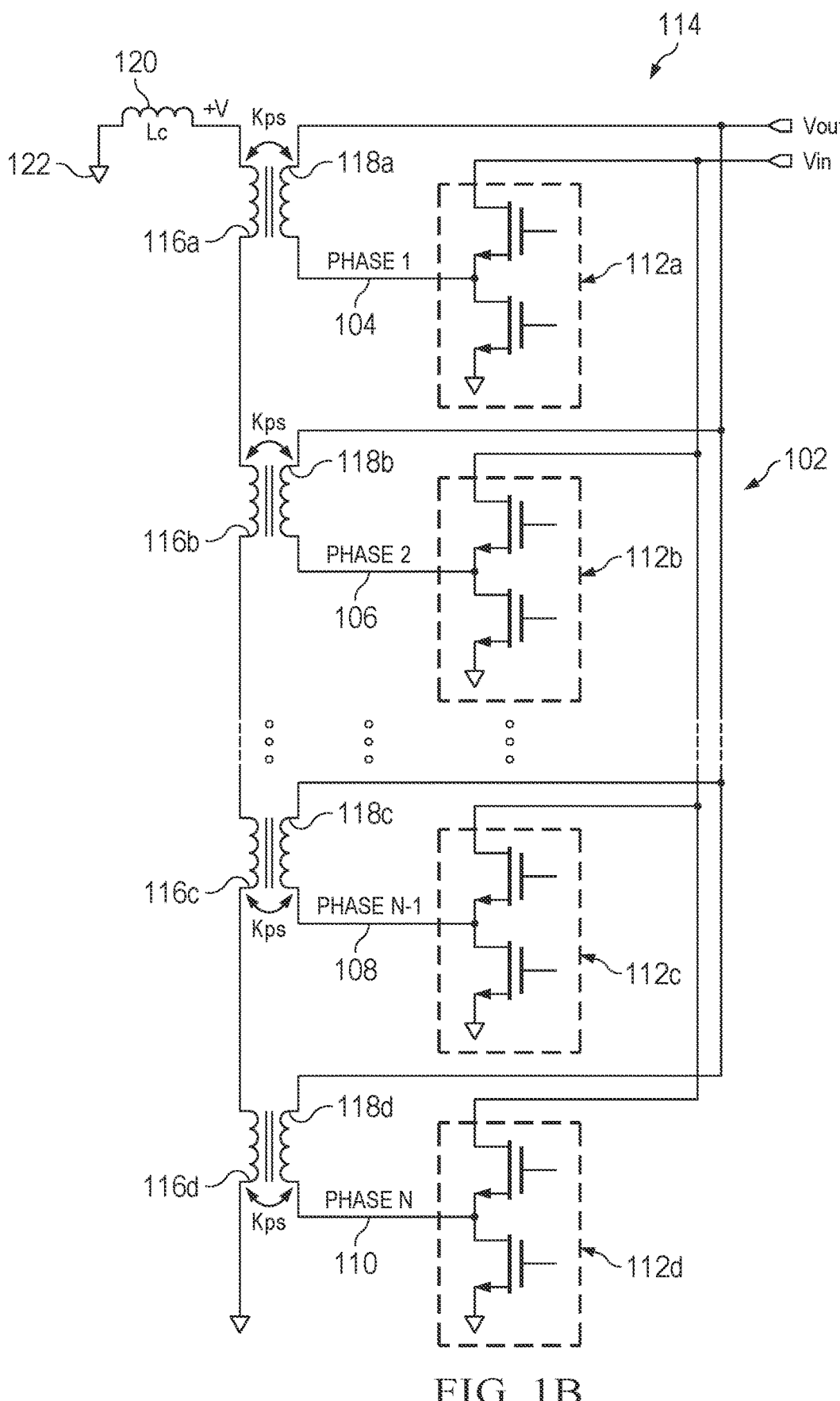
FIG. 1B is a simplified block diagram of a single-secondary trans-inductor voltage regulator circuit, in accordance with an embodiment of the present disclosure.

Turning to FIG. 1B, FIG. 1B illustrates a single-secondary TLVR circuit 114. The single-secondary TLVR circuit 114 can include the multi-phase VR circuit 102. Each phase of the multi-phase VR circuit 102 may be associated with a transformer, which may also be known as a TLVR inductor.

Each TLVR inductor can include a primary winding and a secondary winding that serves as an output inductor for each phase. For example, the first phase 104 can have a primary winding 116a and a secondary winding 118a, the second phase 106 can have a primary winding 116b and a secondary winding 118b, the (N-1) phase 108 can have a primary winding 116c and a secondary winding 118c, and the N phase 110 can have a primary winding 116d and a secondary winding 118d. The primary windings 116a-116d can be connected in series to each other, and the series connection can include a compensation inductor 120 and a ground 122.

When a change in duty cycle occurs from a load transient, it is reflected in the secondary winding of each phase. The coupled primary windings note this change instantaneously, allowing all the phases to rapidly adjust their output current. The pulse width modulation (PWM) signals drive each phase where, at steady-state, the phases are interleaved equally. Similar to an N-phase conventional buck topology, a magnetizing current is carried by a magnetizing inductor of each phase. The current through the compensation inductor and primary winding is reflected to the secondary winding of each phase, where the output current is the superposition of each phase stage's magnetizing current (current through secondary winding of each transformer) and the compensation inductor's current. Unlike the TLVR inductor, the construction of the compensation inductor is similar to a traditional VR inductor. The compensation inductor exists to give design engineers the ability to adjust the total inductance, allowing for freedom to adjust to the rise/fall of the converter's output current to match the demand of the controller and manage the tradeoff between transient performance and system stability.

Each transistor 112a-d in the single-secondary TLVR circuit 114 can include a voltage signal input connected to the drain of a first transistor that has its source connected to a secondary winding associated with the phase and the drain of a second transistor that has its source connected to ground. A voltage signal output may be connected to the secondary winding associated with the phase. In some examples, a TLVR circuit may include multiple secondary windings associated with multiple phases based on configuration needs.

Figure 1C:
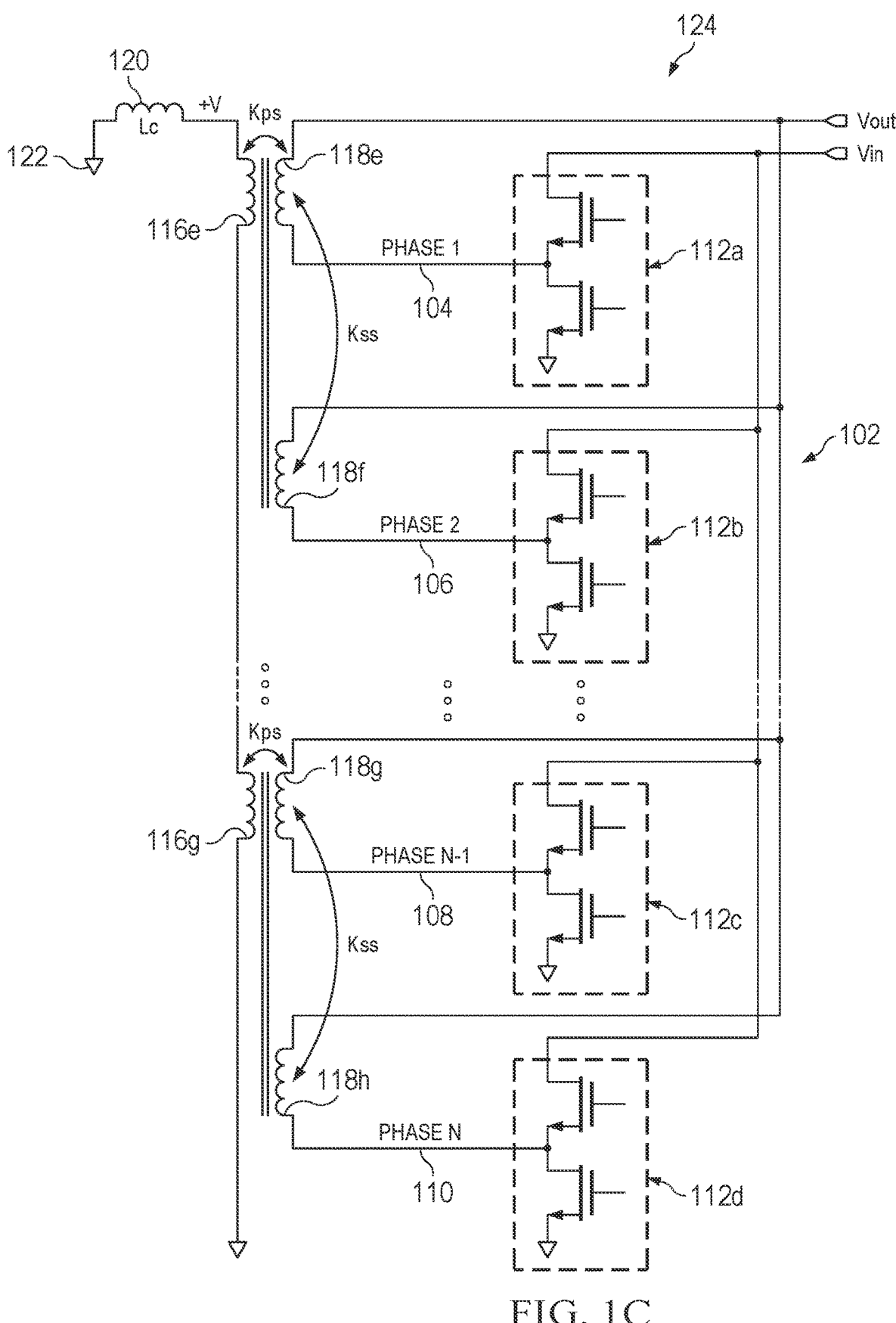
FIG. 1C is a simplified block diagram of a multiple-secondary trans-inductor voltage regulator circuit, in accordance with an embodiment of the present disclosure.

Turning to FIG. 1C, FIG. 1C illustrates a multiple-secondary TLVR circuit 124. The multiple-secondary TLVR circuit 124 can include the multi-phase VR circuit 102. Each magnetic core can have one primary winding and one secondary winding for one phase (illustrated in FIG. 1B), or each magnetic core can have one primary winding and one or more secondary windings for multiple phases. For example, a 6-phase VR can use 6 magnetic cores based on a single-secondary structure or use 3 magnetic cores based on a dual-secondary structure. For purposes of teaching, FIGS. 1B-1C are referenced together in this discussion of FIG. 1C to best understand the broad scope of the present disclosure.

The multi-phase VR circuit 102 can include the first phase 104, the second phase 106, . . . , the (N−1) phase 108, and an N phase 110. The multiple-secondary TLVR circuit 124 is similar to the single-secondary TLVR circuit 114 except the multiple-secondary TLVR circuit 124 can include multiple secondary windings associated with each phase and TLVR inductor. More specifically, each TLVR inductor can include windings that serve as an output inductor for each phase. For example, the TLVR inductor for the first phase 104 can have a primary winding 116e, along with a secondary winding 118e and a secondary winding 118f. The TLVR inductor for the (N−1) phase 108 can include a primary winding 116g and a secondary winding 118g. The N phase 110 can have a secondary winding 118h. The primary windings can be connected in series to each other, and the series connection can include the compensation inductor 120 and the ground 122.

In the single-secondary TLVR circuit 114 of FIG. 1B and the multiple-secondary TLVR circuit 124 of FIG. 1C, each phase has an output inductor that carries direct current and a magnetizing ripple current. Each output inductor winding is considered as a secondary winding of a transformer, where the separate primary winding is tightly coupled to the secondary winding with negligible leakage, and where the coupling coefficient Kps is close to unity. The primary to secondary turns ratio is typically 1:1 and it may be higher. All the primary windings are connected in a series loop with the compensation inductor and the ground.

It is to be understood that other embodiments and implementations of FIGS. 1A-1C may be utilized, and structural changes may be made without departing from the scope of the present disclosure. Substantial flexibility is provided by the system and method in that any suitable changes to the arrangements and configurations presented may be provided without departing from the teachings of the present disclosure. For purposes of illustrating certain example techniques of a TLVR circuit to reduce voltage hazards, the following foundational information may be viewed as a basis from which the present disclosure may be properly explained. A number of prominent technological trends are currently afoot (e.g., more computing devices, more online video services, more Internet traffic, etc.), and these trends are changing the media delivery landscape. One trend is the need for faster response times for multiphase power supplies.

A TLVR circuit greatly improves the transient response times of multiphase power supplies, for example, a multi-phase power supply that is used to power ASIC switch chips. The TLVR circuit can be several 1:1 transformers in series with relatively low leakage. In twelve volt (12V) to 1.8V applications, if all phases are turned on during the loading transient, 10.2V (12V-1.8V) is applied to all the primary windings in sync. Hence, the input side is 12V and the output side is 1.8V in this example scenario. Mathematically, the voltage across the inductor, when the phase is ON, is the input side minus the output side voltage, or 12-1.8=10.2V.

Because the primary windings are connected in series, the voltage on the primary side of the TLVR circuit is N (the number of transformers) times 10.2V. For example, if there are fifteen (15) transformers then fifteen (15) times 10.2V is 153V on the primary side of the TLVR circuit, if there are twenty-five (25) transformers then twenty-five (25) times 10.2V is 255V on the primary side of the TLVR circuit, etc. Some TLVR circuits include over thirty (30) transformers, and they can create a relatively large voltage on the primary side of the TLVR circuit. As a result, the TLVR circuit has the property that high voltages can appear on the primary side of the TLVR circuit during transients. This could create a safety hazard if touched by a user, arc and shock a user, complicate testing, challenge compliance with UL and other certifications, create electromagnetic interference (EMI), break down the dielectric of the printed circuit board that includes the TLVR circuit, and damage the printed circuit board that includes the TLVR circuit (along with the components of the TLVR circuit).

To help prevent high voltages, some solutions include TLVR circuits that can be designed using multiple smaller chains to reduce voltages. For example, some TLVR circuits use two chains, each with nine power stages, in an 18-phase core rail power supply. However, using multiple smaller chains increases the cost because an additional compensation inductor is required per loop, and the TLVR circuit works best with a single loop for all phases. Some other solutions reduce the input voltage (e.g., from 12V down to 4.5V), however such a solution requires another power conversion or major system changes to make the lower voltage available. What is needed is a system, an apparatus, and a method to help reduce voltage hazards in a TLVR circuit without sacrificing performance.

In an example embodiment of the present disclosure, a system and a method can include a TLVR circuit, where the ground is moved from the end of the TLVR loop, or the end of the TLVR circuit that includes the compensation inductor, to a middle portion of the TLVR circuit. The middle portion can be located anywhere between the first phase of the TLVR circuit and the last or N phase of the TLVR circuit. When the string of transformers forces a current change in the loop, the voltage drop across the compensation inductor remains the same. However, if the ground is in the middle of the TLVR circuit, the voltage drop across the transformers on the first side of the ground appears as a positive value, equal to half the voltage drop value and the voltage drop across the transformers on the second side of the ground appears as a negative value, equal to half the voltage drop value. This result greatly reduces the problematic health hazard on the primary side of the TLVR circuit during transients by reducing the voltage to a safe level. This would address many of the aforementioned problems, for example, shocking the user unnecessarily, complicating testing activities, inhibiting the ability to comply with UL and other certifications, damaging the dielectric of the printed circuit board and the TLVR circuit and its components, etc.

In an illustrative non-limiting example, during transients, the voltage drop across the compensation inductor may be one-hundred volts (100V). By locating the ground in the middle of the TLVR circuit, the peak voltage on one side of the compensation inductor would be a positive fifty volts (+50V) and the peak voltage on the other side of the compensation inductor would be a negative fifty volts (−50V) and the positive peak voltage on the first side of the compensation inductor is about the same as an absolute value of the negative peak voltage on the second side of the compensation inductor. More specifically, when the string of transformers forces a current change in the loop, the voltage drop across the compensation inductor is still one-hundred volts (100V). However, in this example, the voltage drop across the transformers on the first side of the ground (e.g., a first ground side 212 of the ground 122 shown in FIG. 2) appears as a positive fifty volts (+50V) on the first side of the compensation inductor (e.g., a first compensation inductor side 208 of the compensation inductor 120 shown in FIG. 2 and the voltage drop across a second side of the ground (e.g., a second ground side 214 of the ground 122 shown in FIG. 2) appears as a negative fifty volts (−50V) on the second side of the compensation inductor (e.g., a second compensation inductor side 210 of the compensation inductor 120 shown in FIG. 2).

In another example, the compensation inductor at one end of the loop is replaced with a compensation inductor with half the inductance of the original single compensation inductor and a second compensation inductor, also with half the inductance of the original single compensation inductor, is added on the other end of the loop between the ground and the last or N transformer (as shown in FIG. 4 and discussed below). The current is still flowing in the loop, but each compensation inductor having half the value of the original single compensation inductor sees half the voltage, one is positive, and one is negative. When the string of transformers forces a current change in the loop, the voltage change across each compensation inductor is half that of the voltage change across the single compensation inductor, due to the inductance of each being halved.

In an illustrative non-limiting example, where the voltage was one-hundred volts (100V) across one compensation inductor in current TLVR circuits, the voltage across each of the first compensation inductor and the second compensation inductor is fifty volts (50V). The sum of the two voltages is the same as with one compensation inductor, one-hundred volts (100V). The benefit of two compensation inductors, or a pair of compensation inductors, at opposite ends of the TLVR circuit is that the second compensation inductor has a first side grounded, zero volts (0V), so the second side of the second compensation inductor is at negative fifty volts (−50V). The first compensation inductor has a first side grounded but with the current going in the opposite direction, so the second side of the first compensation inductor is at positive fifty volts (+50V) and the peak voltage of the TLVR circuit is reduced.

In another example, a controller can limit the number of phases or transistors that can be turned on or activated at the same time to limit the peak voltage of the TLVR circuit. More specifically, in a TLVR circuit, a controller controls the activation of each phase of the TLVR circuit. The more phases of the TLVR circuit that are activated, the faster the response time is for the TLVR circuit. However, if all the phases are activated, the voltage can build up to a dangerous level. A max_phase_fire threshold can represent the maximum number of phases that can be activated to keep the voltage at or below a voltage threshold. Using the max_phase_fire threshold, a voltage engine in the controller can limit the number of phases that are activated at the same time to keep the overall voltage of the TLVR circuit at or below an acceptable voltage and below a voltage threshold.

Figure 2:
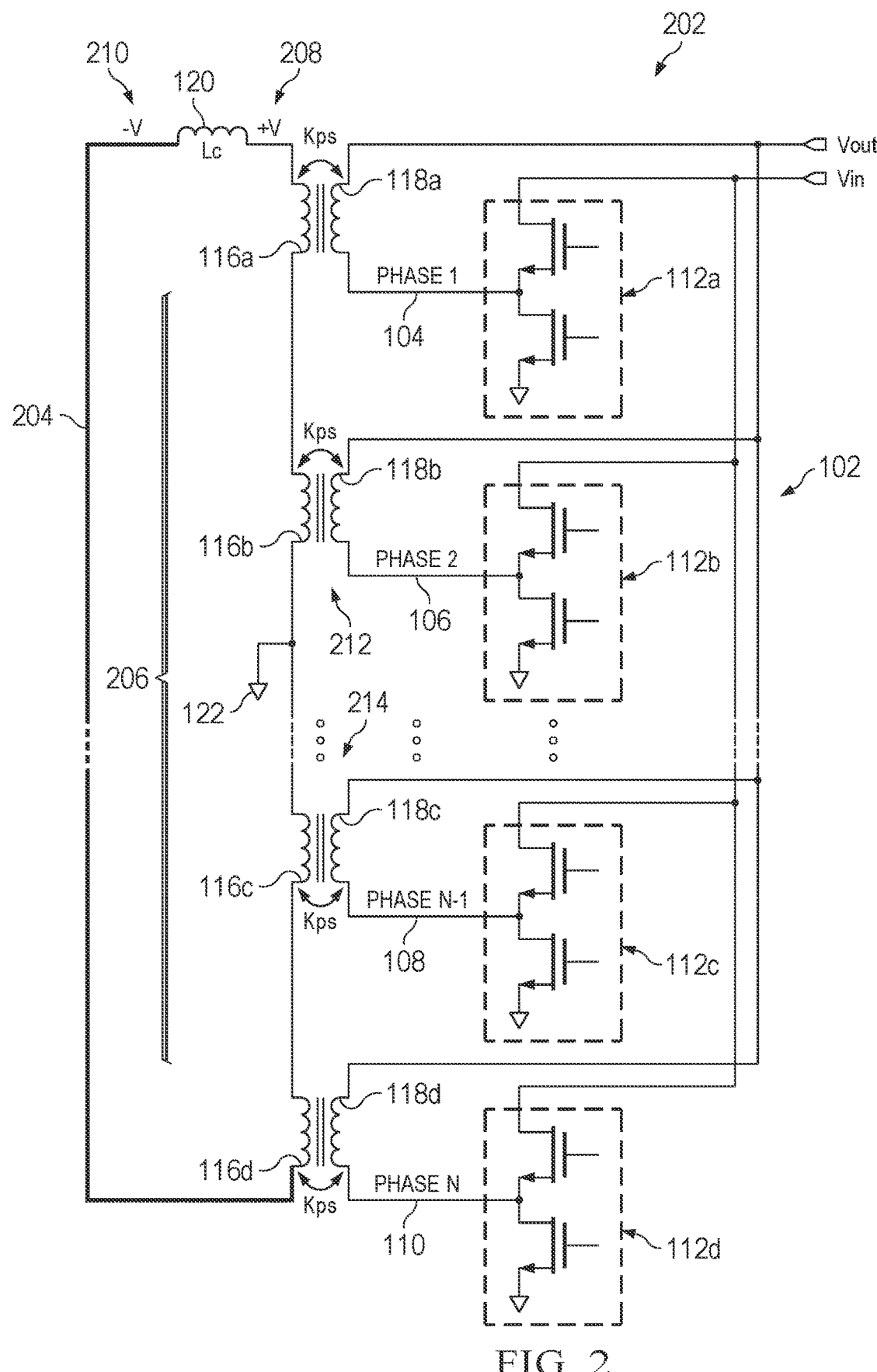
FIG. 2 is a simplified block diagram of a particular implementation of a middle portion grounded single-secondary trans-inductor voltage regulator circuit to help reduce voltage hazards, in accordance with an embodiment of the present disclosure.

Turning to FIG. 2, FIG. 2 is a simplified block diagram of a middle portion grounded single-secondary TLVR circuit 202 to reduce voltage hazards. The middle portion grounded single-secondary TLVR circuit 202 can include the multiphase VR circuit 102. The N phase 110 of middle portion grounded single-secondary TLVR circuit 202 can be a phase number greater than twenty phases (20), greater than twenty-five phases (25), greater than thirty phases (30), or almost any number of phases depending on design choice and design constraints.

As in the case discussed above, each TLVR inductor can include the primary winding and the secondary winding that serve as an output inductor for each phase. The primary windings 116a-116d can be connected in series to each other in a loop 204 and the series connection can include the compensation inductor 120 and the ground 122. The compensation inductor 120 has a first compensation inductor side 208 and an opposite second compensation inductor side 210, as shown in FIG. 2. The ground has a first ground side 212 and an opposite second ground side 214.

The ground can be located in a middle portion 206 of the middle portion grounded single-secondary TLVR circuit 202 such that at least the first phase is on the first ground side 212 of the ground and at least the N phase is on the opposite second ground side 214 of the ground. The middle portion 206 can be located anywhere between the first phase and the N phase. More specifically, the middle portion 206 can be located anywhere between the primary winding 116a and the primary winding 116d. For example, as illustrated in FIG. 2, the middle portion 206 is located between the second phase 106 and the primary winding 116b, and the (N−1) phase 108 and the primary winding 116c. In some examples, the ground 122 is located between an equal number of the phases of the middle portion grounded single-secondary TLVR circuit 202. In other examples, between about seventy percent (70%) to about fifty percent (50%) of the phases of the middle portion grounded single-secondary TLVR circuit are on the first ground side 212, and between about thirty percent (30%) to about fifty percent (50%) of the phases of the middle portion grounded single-secondary TLVR circuit are on the opposite second ground side 214.

In yet other examples, about ninety-nine percent (99%) to about fifty percent (50%) of the phases of the middle portion grounded single-secondary TLVR circuit 202 are on the first ground side 212 and between about one percent (1%) to about fifty percent (50%) of the phases of the middle portion grounded single-secondary TLVR circuit 202 are on the opposite second ground side 214. The ground can be located anywhere between the first phase and the N phase of the middle portion grounded single-secondary TLVR circuit 202, depending on design choice and design constraints.

When the string of transformers forces a current change, the voltage drop across the compensation inductor 120 is the same as if the ground were located next to the compensation inductor 120, as in the discussed TLVR circuits (e.g., see FIG. 1B). However, the voltage drop across the transformers on the first ground side 212 appears as a positive value on the first compensation inductor side 208 (the right side of the compensation inductor 120 illustrated in FIG. 2) and the voltage drop across the transformers on the second ground side 214 appears as a negative value on the second compensation inductor side 210 (the left side of the compensation inductor 120 illustrated in FIG. 2).

In an illustrative non-limiting example, where the voltage is one-hundred volts (100V) across the compensation inductor 120 and the ground is located in the middle of the TLVR circuit, half of the transformers are on the first ground side 212 so they create positive fifty volts (+50V) at the first compensation inductor side 208 of the compensation inductor 120 and half of the transformers are on the second ground side 214 so they create negative fifty volts (−50V) at the second compensation inductor side 210 of the compensation inductor 120. If the ground is not in the middle of the inductors of the TLVR circuit, for example, seventy percent (70%) of the transformers are on the first ground side 212 and thirty percent (30%) of the transformers are on the second ground side 214, then the transformers that are on the first ground side 212 will create about positive seventy volts (+70V) at the first compensation inductor side 208, and the transformers that are on the second ground side 214 will create about negative thirty volts (−30V) at the second compensation inductor side 210.

Figure 3:
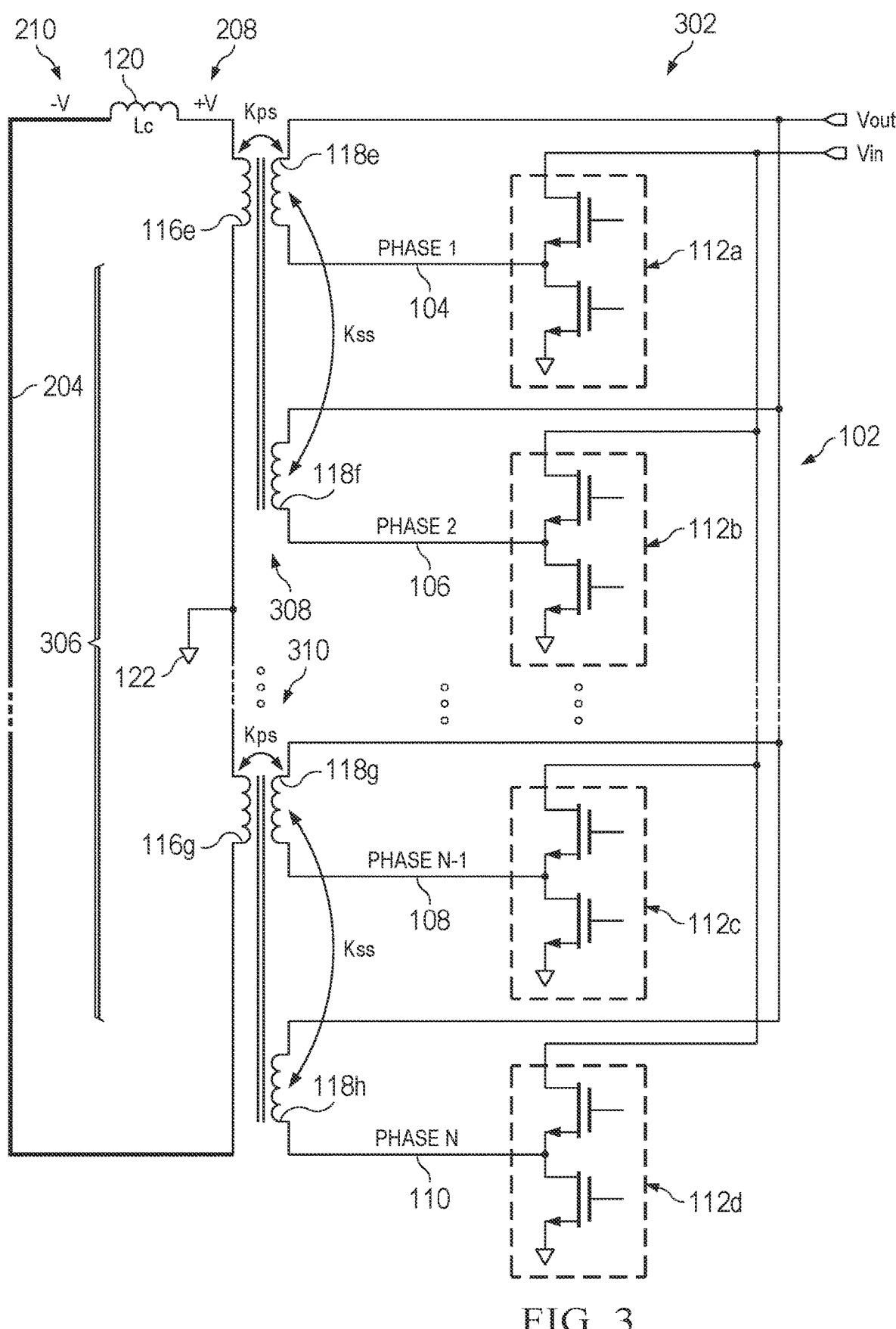
FIG. 3 is a simplified block diagram of a particular implementation of a middle portion grounded multiple-secondary trans-inductor voltage regulator circuit to help reduce voltage hazards, in accordance with an embodiment of the present disclosure.

Turning to FIG. 3, FIG. 3 is a simplified block diagram of a middle portion grounded multiple-secondary TLVR circuit 302 that can be used to reduce voltage hazards. The middle portion grounded multiple-secondary TLVR circuit 302 can include the multi-phase VR circuit 102, as discussed above.

The middle portion grounded multiple-secondary TLVR circuit 302 is similar to the middle portion grounded single-secondary TLVR circuit 202 except the middle portion grounded multiple-secondary TLVR circuit 302 can include two or more secondary windings associated with each phase and TLVR inductor. More specifically, each TLVR inductor in the middle portion grounded multiple-secondary TLVR circuit 302 can include a primary winding and two or more secondary windings that serve as an output inductor for each phase.

In an illustrative non-limiting example, where the voltage is one-hundred volts (100V) across the compensation inductor 120 and the ground is located in the middle of the middle portion grounded multiple-secondary TLVR circuit 302, half of the transformers are on the first ground side 308 so they create positive fifty volts (+50V) at the first compensation inductor side 208 of the compensation inductor 120 and half of the transformers are on the second ground side 310 so they create negative fifty volts (−50V) at the second compensation inductor side 210 of the compensation inductor 120. If the ground is not in the middle of the inductors of the middle portion grounded multiple-secondary TLVR circuit 302, for example, forty-five percent (45%) of the transformers are on the first ground side 308 of the ground 122 and fifty-five percent (55%) of the transformers are on the second ground side 310 of the ground 122, then the transformers that are on the first ground side 308 of the ground 122 will create about positive forty-five volts (+45V) at the first compensation inductor side 208 of the compensation inductor 120 and the transformers that are on the second ground side 310 of the ground 122 will create about negative fifty-five volts (−55V) at the second compensation inductor side 210 of the compensation inductor 120.

Figure 4A:
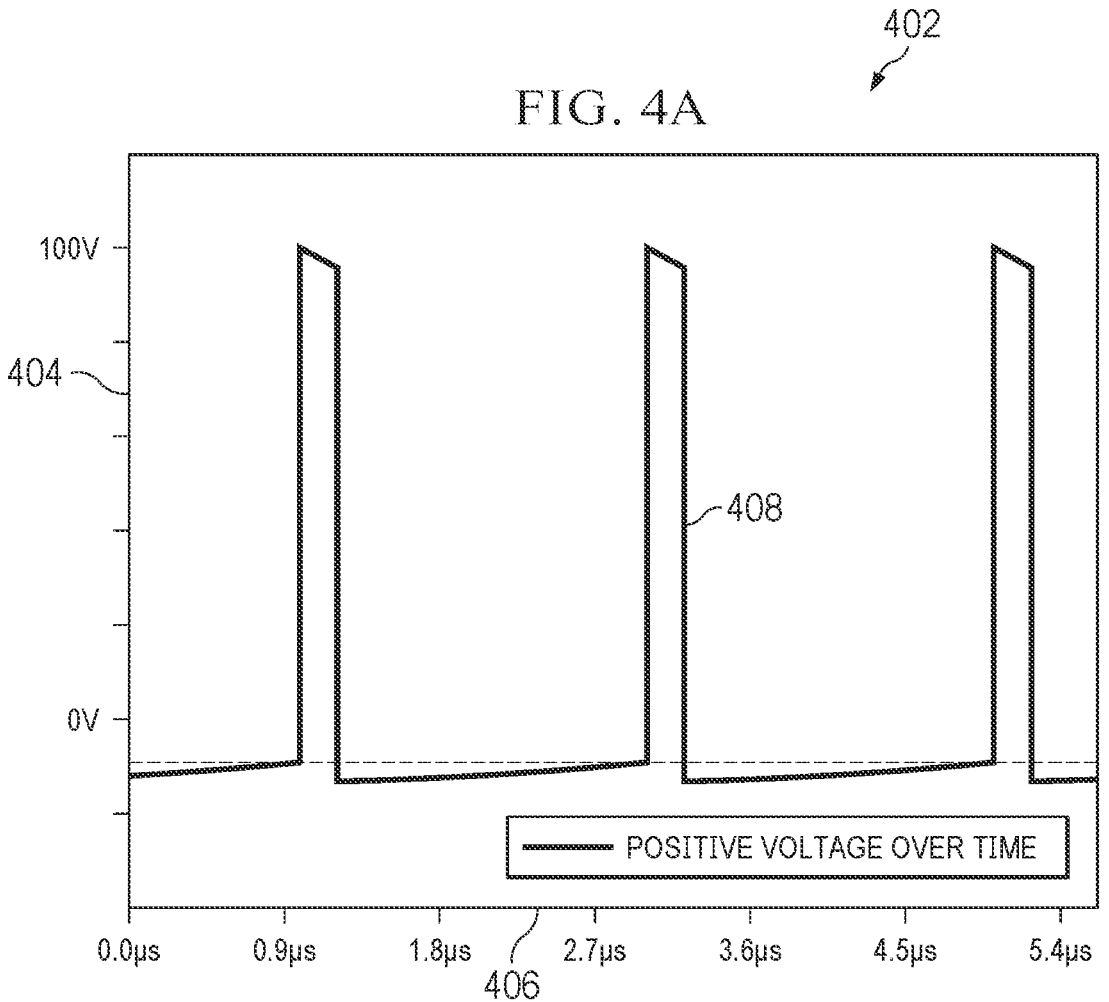
FIG. 4A is a simplified non-limiting graph illustrating example details of the voltage output of the single-secondary trans-inductor voltage regulator circuit illustrated in FIG. 1B, in accordance with an embodiment of the present disclosure.

Turning to FIG. 4A, FIG. 4A is simplified non-limiting graph 402 illustrating example details of the voltage output of the single-secondary TLVR circuit 114 illustrated in FIG. 1B. The graph 402 can include a voltage y-axis 404 and a time x-axis 406. As illustrated in FIG. 4A, the voltage output of the single-secondary TLVR circuit 114 illustrated in FIG. 1B has a single +V component 408. In an illustrative example, if all phases are turned on during the loading transient, the peak voltage across one side of the compensation inductor is one-hundred volts (100V).

Figure 4B:
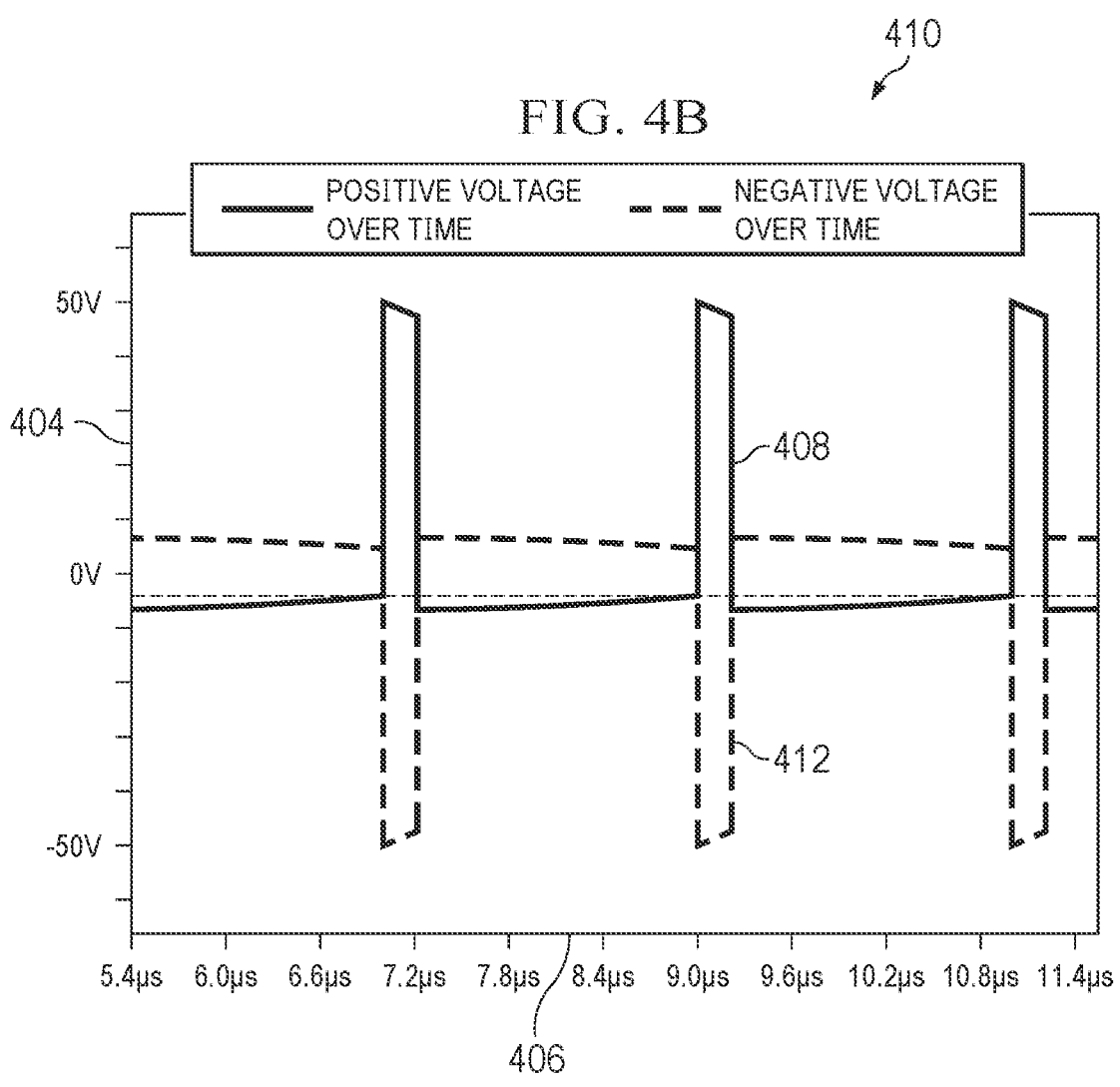
FIG. 4B is a simplified non-limiting graph illustrating example details of the voltage output of the middle portion grounded single-secondary trans-inductor voltage regulator circuit illustrated in FIG. 2, in accordance with an embodiment of the present disclosure.

Turning to FIG. 4B, FIG. 4B is simplified non-limiting graph 410 illustrating example details of the voltage output of the middle portion grounded single-secondary TLVR circuit 202 illustrated in FIG. 2 with the ground 122 in the middle of the middle portion grounded single-secondary TLVR circuit 202. The graph 410 can include the voltage y-axis 404 and the time x-axis 406. As illustrated in FIG. 4B, the voltage output of the middle portion grounded single-secondary TLVR circuit 202 illustrated in FIG. 2 can include the +V component 408 and a −V component 412. The voltage drop across the transformers on the first ground side 212 appears as a positive value on the first compensation inductor side 208 of the compensation inductor 120 (in FIG. 2, the right side of the compensation inductor 120), and the voltage drop across the transformers on the second ground side 214 appears as a negative value on the second compensation inductor side 210 of the compensation inductor 120 (in FIG. 2, the left side of the compensation inductor 120).

If the ground is in the middle of the inductors of the middle portion grounded single-secondary TLVR circuit 202, then the +V component 408 of the voltage drop across the compensation inductor 120 and the −V component 412 of the voltage drop across the compensation inductor 120 will be about equal, as illustrated in FIG. 4B. If, for example, sixty percent (60%) of the transformers are on the first ground side 212 and forty percent (40%) of the transformers are on the second ground side 214, then the +V component 408 will be about sixty percent (60%) of the total voltage drop and the −V component 412 will be about forty percent (40%) of the total voltage drop.

Figure 5:
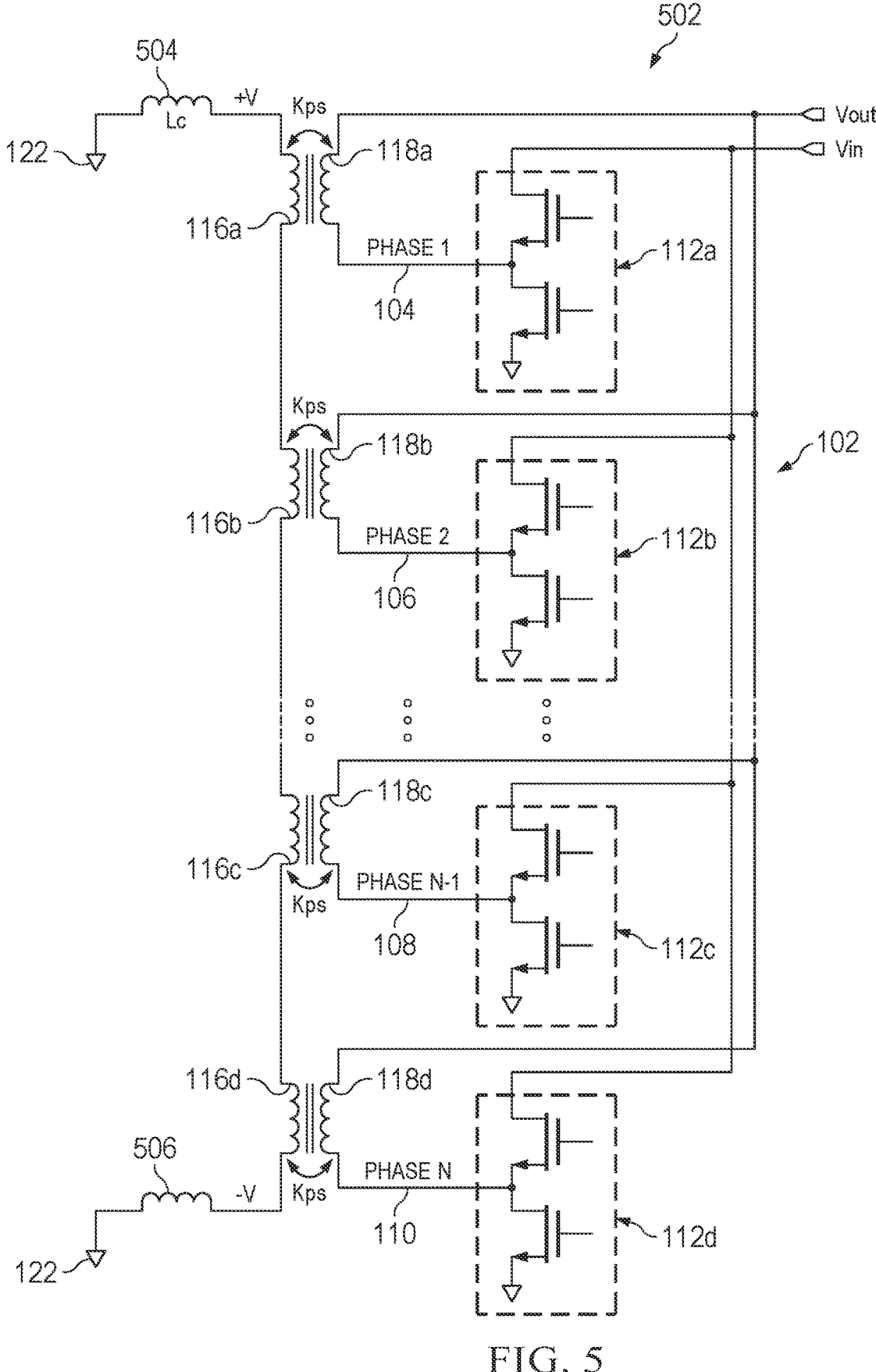
FIG. 5 is a simplified block diagram of a dual compensation trans-inductor voltage regulator circuit to help reduce voltage hazards, in accordance with an embodiment of the present disclosure.

Turning to FIG. 5, FIG. 5 is a simplified block diagram of a dual compensation inductor TLVR circuit 502 to help enable a TLVR to reduce voltage hazards, in accordance with an embodiment of the present disclosure. The dual compensation inductor TLVR circuit 502 can include the multi-phase VR circuit 102, as detailed above. The primary windings 116a-116d can be connected in series to each other in a loop and the series connection can include the ground 122, a first compensation inductor 504, and a second compensation inductor 506.

The first compensation inductor 504 is located at a first end of the dual compensation inductor TLVR circuit 502, between the ground and the first phase 104. The second compensation inductor 506 is located at an opposite second end of the dual compensation inductor TLVR circuit 502, between the ground and the N phase 110. If the first compensation inductor 504 and the second compensation inductor 506 have the same inductance, when the string of transformers forces a current change in the loop, the voltage change across each inductor is half the voltage that would be seen by a single compensation inductor.

In an illustrative non-limiting example, where the voltage drop is one-hundred volts (100V) and the first compensation inductor 504 and the second compensation inductor 506 have the same inductance, the first compensation inductor 504 and the second compensation inductor 506 in the dual compensation inductor TLVR circuit 502 will only see fifty volts (50V) each. More specifically, the first compensation inductor 504 located between the ground and the first phase has zero volts (0V) on the grounded side and positive fifty volts (+50V) on the opposite side near the first phase. The second compensation inductor 506 located between the ground and the N phase 110 has zero volts (0V) on the grounded side and negative fifty volts (−50V) on the opposite second side near the N phase 110.

Figure 6:
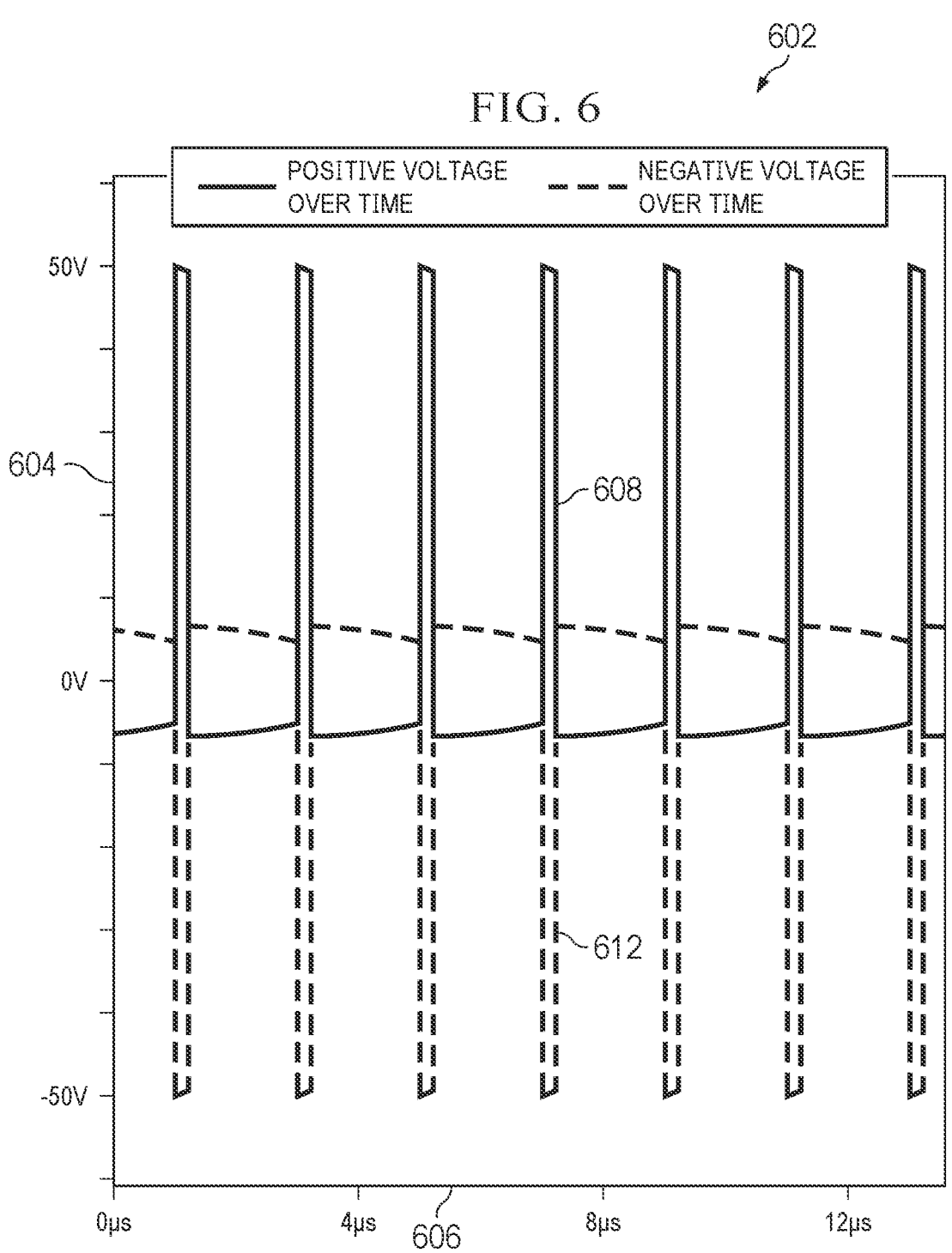
FIG. 6 is a simplified non-limiting graph illustrating example details of the voltage output of the dual compensation trans-inductor voltage regulator circuit illustrated in FIG. 5, in accordance with an embodiment of the present disclosure.

Turning to FIG. 6, FIG. 6 is simplified non-limiting graph 602 illustrating example details of the voltage output of the dual compensation inductor TLVR circuit 502 illustrated in FIG. 5 with the first compensation inductor 504 and the second compensation inductor 506. The graph 602 can include the voltage y-axis 604 and the time x-axis 606. As illustrated in FIG. 6, the voltage output of the dual compensation inductor TLVR circuit 502 illustrated in FIG. 5 can include the +V component 608 and the −V component 612. The voltage drop across the first compensation inductor appears as the +V component 608 and the voltage drop across the second compensation inductor appears as the −V component 612.

If the first compensation inductor and the second compensation inductor are the same value (have the same inductance), the +V component 608 of voltage drop across the first compensation inductor and the −V component 612 of the voltage drop across the second compensation inductor will be about equal, as illustrated in FIG. 6. If the first compensation inductor and the second compensation inductor are not the same value (do not have the same inductance), the +V component 608 of voltage drop across the first compensation inductor and the −V component 612 of the voltage drop across the second compensation inductor will be proportional to the difference in value between the first compensation inductor and the second compensation inductor. For example, if the second compensation inductor has a value that is half of the value of the first compensation inductor, then the +V component 608 of voltage drop across the first compensation inductor will be about twice the −V component 612 of the voltage drop across the second compensation inductor. The value of the first compensation inductor and the second compensation inductor can be almost any value, depending on design choice and design constraints.

Figure 7:
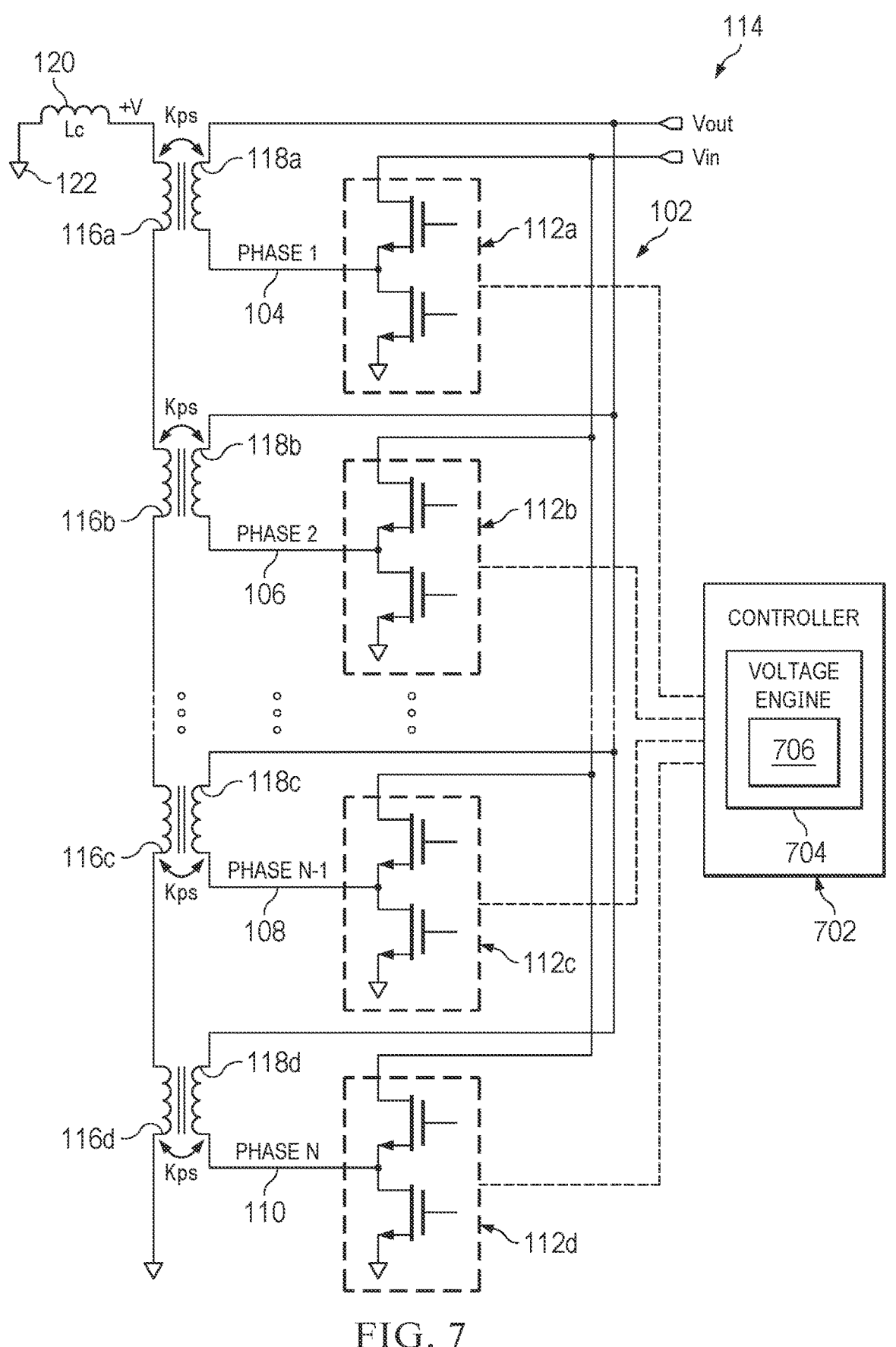
FIG. 7 is a simplified block diagram of a controller used to control a trans-inductor voltage regulator circuit to help reduce voltage hazards, in accordance with an embodiment of the present disclosure.

Turning to FIG. 7, FIG. 7 is a simplified block diagram illustrating example details of a controller 702 used to control a TLVR circuit to help reduce voltage hazards, in accordance with an embodiment of the present disclosure. As illustrated in FIG. 7, the controller 702 can include a voltage engine 704. The voltage engine 704 can include a max_phase_fire threshold 706 in this example configuration. The controller 702 can be used such that the number of phases used does not extend above a threshold value. Hence, the controller 702 can control a TLVR circuit such that only a maximum number of phases (the max_phase_fire threshold 706) can be turned on at the same time. More specifically, in response to a preset number X stored as the max_phase_fire threshold 706, the voltage engine 704 will only allow X phases to turn on at the same time. It should be reiterated that the present disclosure is not so limited to 'preset', or 'predetermined' embodiments involving targets or thresholds, as this has only been offered for example purposes. Other configurations, such as 'on the fly' embodiments, are well within the broad scope or the present disclosure. Additionally, the preset, threshold, and predetermined settings can be approximate, or nearing toward a designated target or range. All such possibilities are included within this broad language.

The controller 702 controls the activation of each phase of the single-secondary TLVR circuit. The more phases of the single-secondary TLVR circuit that are activated, the faster the response time is for the single-secondary TLVR circuit. However, if all the phases are activated, the voltage can build up to a dangerous level. The max_phase_fire threshold 706 can represent the maximum number of phases that can be activated to keep the voltage of the single-secondary TLVR circuit at or below an acceptable voltage. Using the max_phase_fire threshold 706, the voltage engine 704 can limit the number of phases that are activated at the same time to keep the maximum voltage of the single-secondary TLVR circuit at or below an acceptable voltage.

Figure 8:
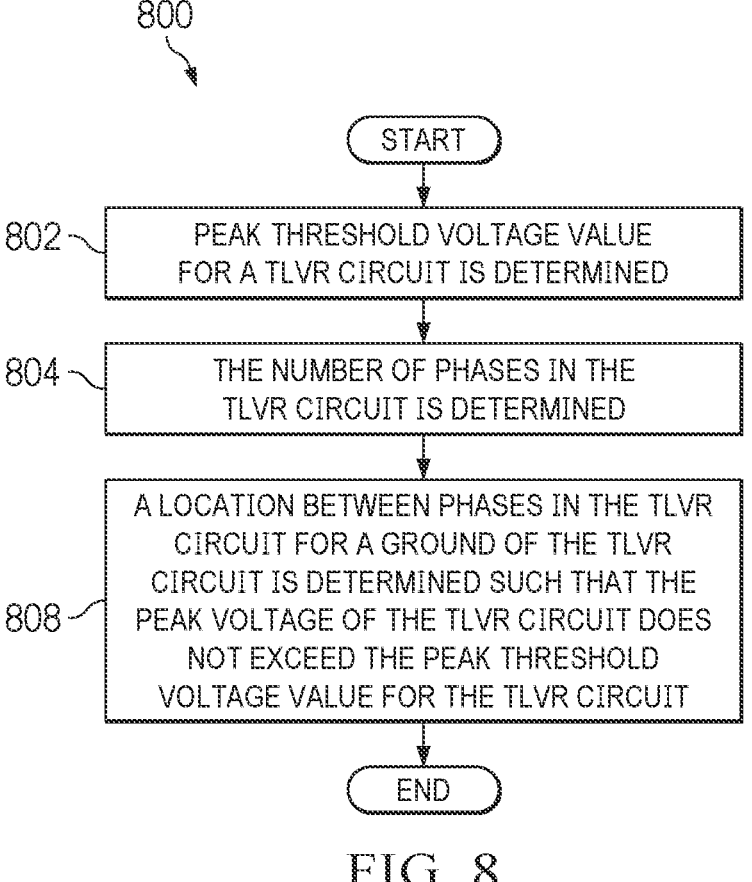
FIG. 8 is a simplified flowchart illustrating potential operations to determine a location of a ground for a trans-inductor voltage regulator circuit to help reduce voltage hazards, in accordance with an embodiment of the present disclosure.

Turning to FIG. 8, FIG. 8 is an example flowchart illustrating possible operations of a flow 800 that may be associated with designing a system, an apparatus, and a method to help enable a TLVR circuit to reduce voltage hazards. At 802, a peak threshold voltage value for a TLVR circuit is determined. For example, the user can determine that a TLVR circuit should not exceed one-hundred and twenty volts (120V). Note that the 120V DC can be found in International Electrotechnical Commission (IEC) Standards, in European Union Deutsches Institut für Normung (DIN) Standards, and in Brazilian Standards. Other example use cases for the present disclosure can include, but is not limited to, 42.4V peak, 60V DC, 75V DC, etc., along with a plethora of AC root mean square (RMS) requirements such as 50V AC.

At 804, the number of phases in the TLVR circuit is determined. For example, based on a desired response time (a target response time) of the TLVR circuit, the number of phases needed for the desired response time is determined and designed into the TLVR circuit. At 808, a location between phases in the TLVR circuit is determined for a ground of the TLVR circuit such that the peak voltage of the TLVR circuit does not exceed the peak threshold voltage value for the TLVR circuit. For example, a ground for the TLVR circuit can be located somewhere in a middle portion (e.g., the middle portion 206 of FIG. 2) of a TLVR circuit such that the voltage drop across the transformers on a first ground side (e.g., the first ground side 212 of FIG. 2) appears as a positive value on a first side of the compensation inductor (e.g., the first compensation inductor side 208 of the compensation inductor) and the voltage drop across the transformers on a second ground side (e.g., the second ground side 214) appears as a negative value on a second side of the compensation inductor (e.g., the second compensation inductor side of the compensation inductor).

Figure 9:
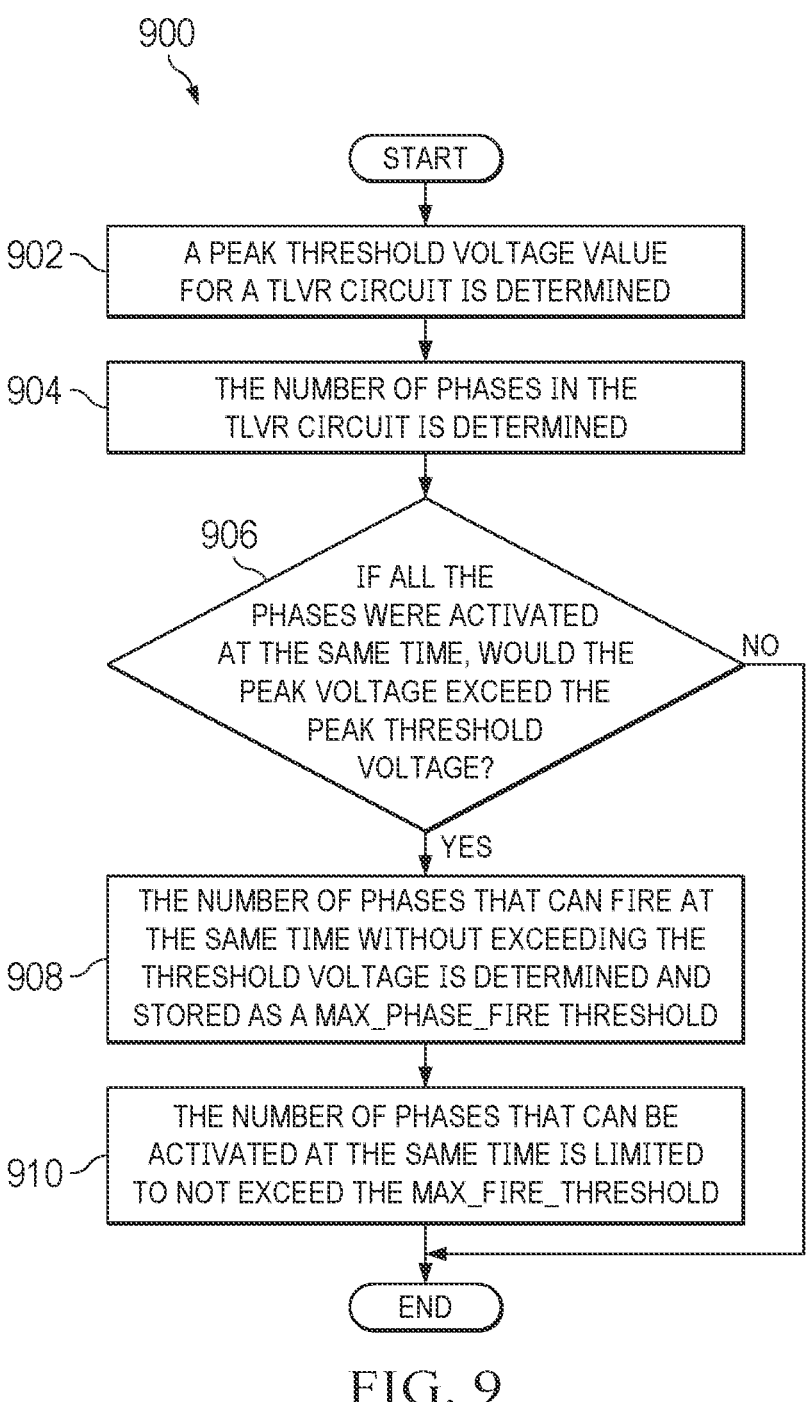
FIG. 9 is a simplified flowchart illustrating potential operations to limit the number of phases that are activated in a trans-inductor voltage regulator circuit to help reduce voltage hazards, in accordance with an embodiment of the present disclosure.

Turning to FIG. 9, FIG. 9 is an example flowchart illustrating possible operations of a flow 900 for controller 702 and voltage engine 704, both of which may be associated with a system, an apparatus, and a method to help enable a TLVR circuit to reduce voltage hazards. To that end, both controller 702 and voltage engine 704 may be provided within or in conjunction with a TLVR circuit for performing the activities discussed in FIG. 9.

At 902, a peak threshold voltage value for a TLVR circuit is determined. For example, the user can determine that a TLVR circuit should not exceed one-hundred and twenty volts (120V). At 904, the number of phases in the TLVR circuit is determined. At 906, the system determines that if all the phases were activated at the same time, the peak voltage would exceed the peak threshold voltage. If the peak voltage would not exceed the peak threshold voltage if all the phases were activated at the same time, the process ends. If the peak voltage would exceed the peak threshold voltage if all the phases were activated at the same time, the number of phases that can be activated at the same time without exceeding the threshold voltage is determined and stored as a max_phase_fire threshold, as indicated in 908. For example, the number of phases that can be activated at the same time without exceeding the threshold voltage can be determined and stored as a max_phase_fire threshold (e.g., the max_phase_fire threshold 706). At 910, the number of phases that can be activated at the same time is limited to not exceed the max_phase_fire threshold. For example, using the max_phase_fire threshold (e.g., the max_phase_fire threshold 706), a voltage engine (e.g., voltage engine 704) can limit the number of phases that are activated by a controller (e.g., controller 702) to keep the overall voltage of a TLVR circuit at or below an acceptable voltage.

In the description, various aspects of the illustrative implementations are described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments. The terms "substantially," "close," "approximately," "near," and "about," generally refer to being within +/−20% of a target value based on the context of a particular value as described herein or as known in the art. Similarly, terms indicating orientation of various elements (e.g., "coplanar," "perpendicular," "orthogonal," "parallel," or any other angle between the elements) generally refer to being within +/−20% of a target value based on the context of a particular value as described herein or as known in the art.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Substantial flexibility is provided by the TLVR circuit to reduce voltage hazards and the system and method to help enable the TLVR circuit to reduce voltage hazards in that any suitable arrangements, chronologies, configurations, and timing mechanisms may be provided without departing from the teachings of the present disclosure.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the TLVR circuit to reduce voltage hazards and the system and method to enable the TLVR circuit to reduce voltage hazards and their teachings are readily scalable and can accommodate a large number of components, as well as more complicated/sophisticated arrangements and configurations. Accordingly, the examples provided should not limit the scope or inhibit the broad teachings of the TLVR circuit to reduce voltage hazards and the system and method to help enable the TLVR circuit to reduce voltage hazards and as potentially applied to a myriad of other architectures.

It is also important to note that the operations in the preceding flow diagrams (i.e., FIGS. 8 and 9) illustrate only some of the possible correlating scenarios and patterns that may be executed, some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the system and method have been illustrated with reference to particular elements and operations, these elements and operations may be replaced by any suitable architecture, protocols, and/or processes that achieve the intended functionality of the system and method.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A trans-inductor voltage regulator (TLVR) circuit, comprising:
   a multi-phase voltage regulator circuit;
   a plurality of phases of a primary winding connected in series, wherein the plurality of phases includes a first phase and a last phase;
   a ground located between the first phase and the last phase; and a compensation inductor situated such that at least one of the plurality of phases is between the ground and the compensation inductor.

2. The trans-inductor voltage regulator circuit of claim 1, wherein the ground is located in a middle portion of the plurality of phases.

3. The trans-inductor voltage regulator circuit of claim 1, wherein the ground is located between an equal number of the plurality of phases.

4. The trans-inductor voltage regulator circuit of claim 1, wherein a first number of phases on a first side of the ground is different than a second number of phases on a second side of the ground.

5. The trans-inductor voltage regulator circuit of claim 1, wherein the trans-inductor voltage regulator circuit is configured to turn on a number of the plurality of the phases corresponding to a target response time.

6. The trans-inductor voltage regulator circuit of claim 1, wherein the trans-inductor voltage regulator circuit includes a pair of compensation inductors having a connection that is the ground, and wherein, when a peak voltage on a side of the compensation inductor is positive, a peak voltage on another side of the compensation inductor is negative.

7. The trans-inductor voltage regulator circuit of claim 1, wherein the compensation inductor includes a first side and an opposite second side, and wherein, when a peak voltage on one of the sides is positive, a peak voltage on another one of the sides is negative.

8. The trans-inductor voltage regulator circuit of claim 1, wherein a peak voltage on a first side of the compensation inductor and a peak voltage on a second side of the compensation inductor is below a voltage threshold.

9. The trans-inductor voltage regulator circuit of claim 1, wherein between seventy percent and fifty percent of the plurality of phases are on a first side of the ground, and between thirty percent and fifty percent of the plurality of phases are on an opposite second side of the ground.

10. The trans-inductor voltage regulator circuit of claim 1, wherein the plurality of phases connected in series is greater than twenty-five phases.

11. A method, comprising:

determining a peak threshold voltage for a trans-inductor voltage regulator circuit that includes a plurality of phases of a primary winding connected in series, wherein the plurality of phases includes a first phase and a last phase, and wherein a compensation inductor is situated such that at least one of the plurality of phases is between a ground and the compensation inductor; and configuring the ground between the plurality of phases in the trans-inductor voltage regulator circuit such that a peak voltage of the trans-inductor voltage regulator circuit does not exceed the peak threshold voltage.

12. The method of claim 11, wherein the compensation inductor includes a first side and an opposite second side, and wherein, when a peak voltage on the first side of the compensation inductor is a positive voltage, a peak voltage on the second side of the compensation inductor is a negative voltage.

13. The method of claim 12, wherein the positive peak voltage on the first side of the compensation inductor is about the same as an absolute value of the negative peak voltage on the second side of the compensation inductor.

14. The method of claim 12, wherein more than fifty percent of the phases are on a first side of the ground and less than fifty percent of the phases are on an opposite second side of the ground.

15. The method of claim 11, wherein between seventy percent and fifty percent of the phases are on a first side of the ground and between thirty percent and fifty percent of the phases are on an opposite second side of the ground.

16. The method of claim 11, wherein a total number of phases in the trans-inductor voltage regulator circuit is greater than twenty phases.

17. The method of claim 11, wherein the trans-inductor voltage regulator circuit is a single-secondary trans-inductor voltage regulator circuit or a multiple secondary trans-inductor voltage regulator circuit.

18. A method for using a controller to manage a trans-inductor voltage regulator circuit, comprising:

determining a peak threshold voltage for the trans-inductor voltage regulator circuit, wherein the trans-inductor voltage regulator circuit includes a plurality of phases of a primary winding connected in series and the plurality of phases includes a first phase and a last phase, and wherein a compensation inductor is situated such that at least one of the plurality of phases is between a ground and the compensation inductor; and limiting a number of phases that are activated such that a peak voltage of the trans-inductor voltage regulator circuit does not exceed the peak threshold voltage.

19. The method of claim 18, wherein the number of phases that are activated at the same time without exceeding the threshold voltage is determined and stored as a max-_phase_fire threshold value.

20. The method of claim 19, wherein the max_phase_fire threshold value is stored in a voltage engine in a controller that controls the trans-inductor voltage regulator circuit.

\* \* \* \* \*